United States Patent [19]
Gerfast

[11] Patent Number: 4,929,871
[45] Date of Patent: May 29, 1990

[54] TRANSFORMERLESS CURRENT-LIMITING CIRCUIT

[76] Inventor: Sten R. Gerfast, 1802 Valley Curve Rd., Mendota Heights, Minn. 55118

[21] Appl. No.: 101,764

[22] Filed: Sep. 28, 1987

Related U.S. Application Data

[63] Continuation-in-part of Ser. No. 874,539, Jun. 16, 1986, abandoned.

[51] Int. Cl.⁵ .................... H05B 39/09; H05B 41/16
[52] U.S. Cl. ................... 315/205; 315/207;
  315/227 R; 315/244; 315/247; 318/138; 318/507
[58] Field of Search ............ 315/200 R, 171, 194,
  315/199, 205, 291, 207, 46, 52, 53, 58, 71, 101,
  173, 202, 227 R, 244, 247, 283, DIG. 4, DIG. 5;
  318/138, 503, 507, 519; 363/44, 45, 48, 62, 126;
  340/780, 811; 307/146, 157

[56] References Cited

U.S. PATENT DOCUMENTS

| | | | |
|---|---|---|---|
| 3,857,063 | 12/1974 | Major et al. ................. | 315/207 |
| 4,001,637 | 1/1977 | Gray ........................... | 315/200 R |
| 4,227,118 | 10/1980 | Britton ........................ | 315/200 R |
| 4,376,261 | 3/1983 | von der Heide et al. ...... | 318/138 |
| 4,752,719 | 6/1988 | McEwan ...................... | 315/200 R |

*Primary Examiner*—Eugene R. LaRoche
*Assistant Examiner*—Ali Neyzari
*Attorney, Agent, or Firm*—Robert E. Granrud

[57] ABSTRACT

Appliances such as fluorescent lamps and low-voltage DC motors can be operated from household AC without a transformer by employing a current-limiting circuit which is compact, lightweight, reliable, draws less energy, and has fewer power consuming components than do prior devices for driving those appliances. The current-limiting circuit has 4 rectifiers in a bridge circuit and a current-limiting capacitor which should be selected to match the load, a larger capacitor being necessary to supply a larger current. When used to drive a discharge lamp, the current-limiting circuit should also contain an inductive coil in series with the current-limiting capacitor. Otherwise there may be undue flicker. The inductive coil and capacitor together improve the power factor and therefore reduce the current drawn from the line without reducing the lamp output.

17 Claims, 2 Drawing Sheets

TRANSFORMERLESS CURRENT-LIMITING CIRCUIT

CROSS REFERENCE TO RELATED APPLICATION

This application is a continuation-in-part of copending application Ser. No. 874,539, filed June 16, 1986, now abandoned.

FIELD OF THE INVENTION

The invention concerns a current-limiting circuit by which appliances such as fluorescent lamps and low-voltage DC motors can be operated from household AC without a transformer.

BACKGROUND ART

Most battery-operated appliances are designed to operate at a low voltage, "low voltage" indicating less than 50 volts. Such appliances include portable computers, calculators, radios, televisions, and hand tools. In order to operate from AC household current, such an appliance is often equipped with a current-limiting circuit such as a wound-wire transformer, even though such transformers are bulky, heavy, and expensive. It is believed that all brushless DC motors have required transformers to be operated from AC. Some small motors, called universal motors, employ brushes and a commutator to permit operation directly from either AC or DC. Although avoiding the need for a current-limiting circuit, a universal motor is noisy both acoustically and electrically and has relatively short life due to wear of the brushes against the commutator. Moreover, they tend to be expensive to manufacture in very small sizes.

Discharge lamps such as fluorescent lamps need a current-limiting circuit, usually called a "ballast" and typically including one or more transformers and reactors. Since the commercial introduction of fluorescent lamps some 40-50 years ago, their current-limiting circuits have become more efficient and less expensive, but invariably still have energy losses associated with the hysteresis and eddy currents in the laminated steel cores of their transformers.

High-intensity, low-voltage lamps which operate from AC household current also require current-limiting, voltage-reducing circuits, invariably comprising a wound-wire transformer.

Some low-voltage appliances such as radios have employed as a current-limiting circuit a power resistor to permit operation directly from AC household current through a power resistor, but because such resistors are expensive and highly inefficient, they are no longer used for that purpose.

OTHER PRIOR ART

Because the present invention uses a bridge circuit, some of the following U.S. patents my be of interest: No. 3,130,347 (Harpley); No. 3,170,084 (Retzer); 3,265,907 (Kurata et al.). Each of these bridge circuits is used in an adjustable dimmer for a discharge lamp. In Retzer, the discharge lamp is started on AC, but is operated on the DC output from the bridge circuit through an inductive reactor, a transformer, and a resistor.

DISCLOSURE OF INVENTION

The invention provides a current-limiting circuit for driving an appliance of the type discussed above, which circuit is compact, lightweight, highly reliable, and is believed to have fewer power consuming components than do prior devices for driving those appliances. Unlike most of those prior devices, the current-limiting circuit of the invention has no transformer. Unlike transformer-containing circuits, the novel circuit draws no power in the stand-by mode. For these and other reasons, the novel circuit is believed to be more energy efficient and also less expensive than are prior circuits. When used to drive a discharge lamp, tests indicate that the novel circuit draws less current, runs cooler, and is less noisy acoustically than are the prior ballasts. When used to drive a reduced-voltage incandescent lamp, tests indicate that the novel circuit draws less current. The novel current-limiting circuit also permits battery-operated devices to be operated directly from 120-volt household AC.

Briefly, the novel transformerless current-limiting circuit comprises:

(1) a 4-rectifier bridge circuit having a pair of AC inputs and a pair of DC outputs,

(20) a pair of single-phase or two-phase AC terminals, (3) means for connecting an appliance (which may comprise a motor or an incandescent or discharge lamp) across the DC outputs, (4) circuitry selected from (a) a current-limiting capacitor and (b) an inductive coil and a current-limiting capacitor connected in series, said circuitry being connected between one of the AC inputs and one of the AC terminals and providing the sole connection there between, the other of the AC inputs and AC terminals being directly interconnected.

By "a 4-rectifier bridge circuit" is meant a bridge circuit of exactly four rectifiers.

The size of the current-limiting capacitor should be selected to match the load, a larger capacitor being necessary to supply a larger current. If the capacitor were too small, the voltage and current supplied to the appliance would be insufficient to drive it efficiently; if too large, the appliance might be damaged.

When used to drive a discharge lamp, the novel circuit should also contain an inductive coil in series with the current-limiting capacitor. Otherwise there may be undue flicker. The inductive coil and capacitor together improve the power factor and therefore reduce the current drawn from the line without reducing the lamp output. When used to drive a low-voltage incandescent lamp, the inductive coil permits the use of a smaller capacitor, but has no other recognized advantage compared to using the current-limiting capacitor by itself. Furthermore, less current has been required to drive a low-voltage incandescent lamp when the inductive coil has been eliminated.

When the lamp is a discharge lamp, the novel fixture should include a starter which may be a glow starter or, preferably, is an inductive coil that is in near resonance with the lamp.

In operation, the AC input to the bridge circuit is converted into a pulsating DC output of twice the supply frequency. When used to drive a discharge lamp, the higher frequency tends to reduce flicker and also contributes to the improved efficiency for reasons known in the art. In tests on 40-watt, 48-inch fluorescent lamps, the input wattage has been reduced as much as 25% while retaining the same light output.

The novel circuit also has the capability of permitting a small-voltage brushless DC motor to be operated directly from AC, and it is believed that this is the first time that such a motor has been operated from AC without a transformer. When brushless, the life of the motor is fundamentally limited only by the wear of its bearings. Furthermore, a brushless DC motor when equipped with the novel circuit can be substantially as inexpensive as a transformer-operated DC motor, even after deducting the cost of its transformer.

The novel circuit also is useful for current/voltage limiting in a brush-type motor. Because of its compactness, the novel circuit can be built into a motor without requiring a larger housing, and the circuit should not noticeably increase the weight.

The novel current-limiting circuit may be built into the housing of a DC motor which can be brushless. When there is a DC motor, the means (3) of the novel circuit is a stator winding connected across the DC outputs. There should also be a switch connected between the winding and one of the DC outputs to control the current flowing from the capacitor to the winding.

In a brushless DC motor, the switch may be a transistor, and the rotor-position sensor may be a Hall sensor which operates in combination with a permanent magnet of the rotor. The collector lead of the transistor may be connected to the winding and its emitter lead connected to the other of said DC outputs, with the Hall sensor connected to its base lead.

To provide adjustment in output voltage, the novel circuit may include a SCR connected in series with one of the DC outputs. The SCR can be phase controlled by applying a timed gate-controlling pulse from an oscillator which may be stepped in amplitude, each step providing a predetermined voltage across the DC outputs.

To provide a somewhat smoother pulsating DC output voltage, the novel circuit may include a second capacitor connected directly across the two AC inputs. If the output leads are disconnected or exposed, the second capacitor prevents the build-up of voltage across the DC output terminals, thus guarding against shock hazard.

The novel current-limiting circuit preferably is free from components other than those listed above, thus keeping to a minimum both its cost of manufacture and its cost of operation.

THE DRAWING

Figure 1:
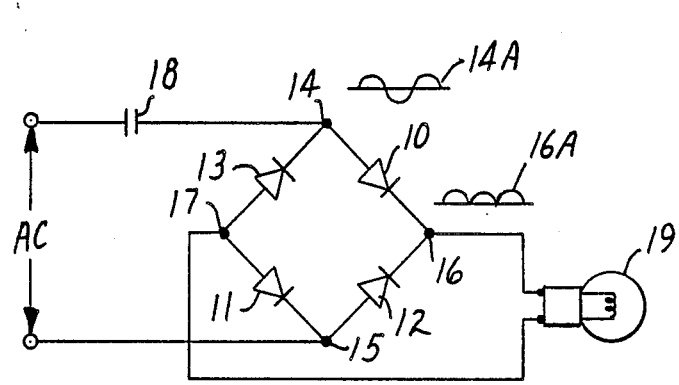
FIG. 1 shows a current-limiting circuit of the invention supplying a reduced-voltage incandescent lamp.

Referring to FIG. 1, four identical rectifiers 10,11,12,13 in a bridge circuit have a pair of AC inputs 14,15 and a pair of DC outputs 16,17. A current-limiting capacitor 18 is connected to the AC input 14, thus providing the sole connection between one input 14 of the AC inputs of the bridge circuit and one of the AC terminals, the other input 15 of the AC inputs and AC terminals being directly interconnected. A reduced-voltage incandescent lamp 19 is connected directly across the DC outputs. The waveform at the AC input 14 is indicated at 14A, and the pulsating DC output of doubled frequency is indicated at 16A.

When the AC input 14 is positive, the current flows through the capacitor 18, the rectifier 10, the lamp 19, the rectifier 11, and back to the AC source. Upon being reversed, current flows through the rectifier 12, the DC output 16, the lamp 19, the rectifier 13, the capacitor 18, and back to the AC source.

Figure 2:
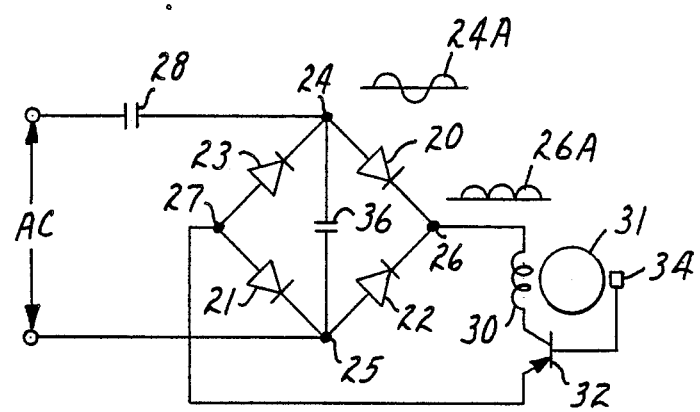
FIG. 2 shows a current-limiting circuit of the invention supplying a brushless DC motor.

In FIG. 2, four identical rectifiers 20,21,22,23 in a bridge circuit have a pair of AC inputs 24,25 and a pair of DC outputs 26,27. A current-limiting capacitor 28 is connected to the AC input 24 and provides the sole connection between one input 24 of the AC inputs of the bridge circuit and one of the AC terminals, the other input 25 of the AC inputs and AC terminals being directly interconnected. Connected directly to the DC output 26 is a stator winding 30 of a brushless DC motor 31. The other lead of the winding is connected to the collector of a power transistor 32 which serves as a switch. Its emitter is directly connected to the other DC output 27, and its base is connected to a Hall sensor 34 which acts as a rotor-position sensor for controlling the timing of current flowing from the capacitor 28 to the stator winding 30. The current-limiting function of the capacitor 28 permits the brushless DC motor 31 to be operated directly from 120-volt household AC without a transformer.

The waveform at the AC input 24 is indicated at 24A, and the pulsating DC output of doubled frequency is indicated at 26A.

To provide a somewhat smoother pulsating DC output voltage and also a safety feature, a second capacitor 36 is connected directly across the two AC inputs 24,25.

Figure 3:
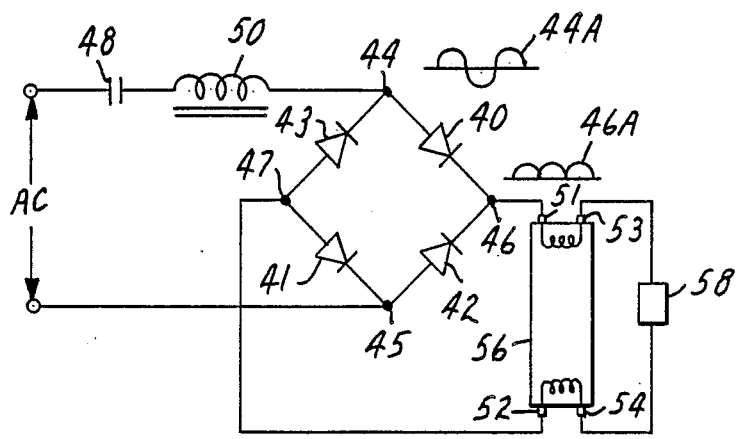
FIG. 3 shows a current-limiting circuit of the invention supplying a fluorescent lamp.

In FIG. 3, four identical rectifiers 40,41,42,43 in a bridge circuit have a pair of AC inputs 45,45 and a pair of DC outputs 46,47. An inductive coil 50 and a current-limiting capacitor 48 are connected in series to the AC input 44 between one input 44 of the AC inputs of the bridge circuit and one of the AC terminals, the other input 45 of the AC inputs and AC terminals being directly interconnected. Cathode leads 51 and 52 of a fluorescent lamp 56 are directly connected across the DC outputs. Connected across cathode leads 53 and 54 of the lamp 56 is an inductive coil 58 which is selected to be at near resonance both with the cyclic discharge rate of the lamp and with the series-connected current-limiting capacitor 48. The inductive coil 58 thus functions as a starter. Since the inductive coil 58 should never need to be replaced, it may be superior to prior starters such as a glow starter.

The waveform at the AC input 44 is indicated at 44A, and the pulsating DC output of doubled frequency is indicated at 46A.

Figure 4:
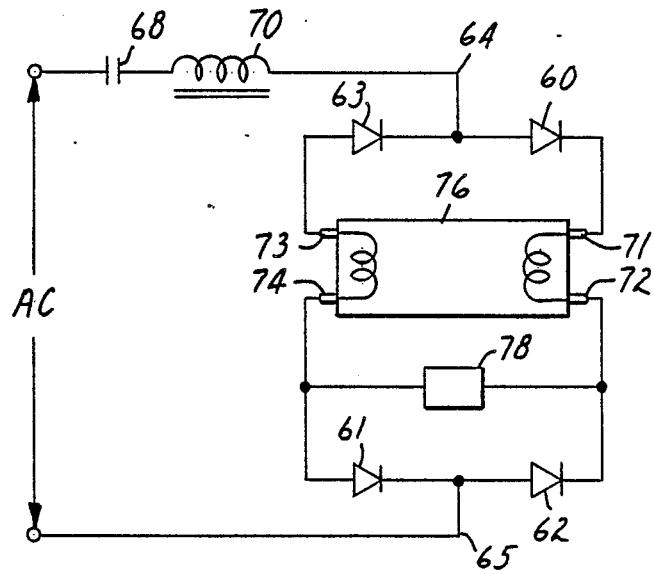
FIG. 4 shows a current-limiting circuit of the invention supplying a another fluorescent lamp.

In FIG. 4, four identical rectifiers 60,61,62,63 in a bridge circuit have a pair of AC inputs 64,65. An inductive coil 70 and a current-limiting capacitor 68 are connected in series to the AC input 64 between one input 64 of the AC inputs of the bridge circuit and one of the AC terminals, the other input 65 of the AC inputs and AC terminals being directly interconnected. Cathode leads 71,72 at one end of a fluorescent lamp 76 are connected across the DC outputs of the rectifiers 60,62, and cathode leads 73,74 at the other end are connected across the DC outputs of the rectifiers 63,61. Connected across the lamp 76 is a starter 78.

When the cathode lead 71 is positive, it is believed that the discharge across the lamp 76 seeks the path of least resistance to the cathode lead 74, and when the cathode lead 72 is positive, the discharge again seeks the path of least resistance to the cathode lead 73. If there is crossfiring according to this theory, there should be no need for a lamp-end reversing circuit to avoid mercury collection at one end of the lamp during DC operation, as generally has been required in the prior art.

EXAMPLE 1

The lamp fixture shown in FIG. 1 was used to operate a miniature, high-intensity incandescent lamp (ANSI #301) designed to operate at 28 volts, 0.17 amp. To do so, the capacitor 18 had been selected (3.9 microfarads) to drive the lamp at its rated 0.17 amp with the AC line voltage at 120 volts.

To provide a comparison, the same lamp was placed in a commercial lamp fixture which included a transformer, and the line voltage was adjusted to drive the lamp at 0.17 amp to provide the same brightness. The equal brightness was verified with a photocell at a distance of 5 inches.

The input wattage using the FIG. 1 circuit was 6.0 watts compared to 6.3 watts when using the commercial fixture.

EXAMPLE 2

The circuit shown in FIG. 2 has been used with a 30-volt brushless DC motor having an ironless stator winding of 240 turns of 32-gauge (0.28-mm) copper wire and an 12-pole permanent magnet rotor. The circuit, which was built into the motor housing, comprised

| Recifiers 20,21,22,23 | 1 N 4004 |
|---|---|
| Capacitor 28 | 5 microfarads |
| Transistor 30 | MJE 800 |
| Hall sensor 34 | MGN 3013 |

To provide a comparative test, the motor (before being connected to the current-limiting circuit of FIG. 2) was operated on 120-volt AC household current through a commercial transformer and rectifier supply to drive a 6.5-inch diameter fan at 1330 rpm. Then after disconnecting the transformer and rectifier supply, the motor was connected into FIG. 2 to drive the same fan, reducing the input voltage of the household current to produce the same 1330 rpm. In doing so, the power requirements were:

| With transformer and rectifier supply: | 10.2 watts |
|---|---|
| With the current-limiting FIG. 2: | 8.1 watts |

EXAMPLE 3

The circuit shown in FIG. 3 has been used as the ballast for a 40-watt, 4-foot fluorescent lamp [F40 CW (cool white)]:

| Rectifiers 40,41,42,43 | 1 N 4004 |
|---|---|
| Capacitor 48 | 4 microfarads |
| Inductive coil 50 | 320 milliHenries |

This was tested in comparison to a commercially purchased one-lamp, rapid-start fixture (Underwriters Laboratories listed C 206.477) according to ANSI Test Standard 98-2 except at a temperature of 18° C. First using the commercial fixture, the light output was measured at 120 volts. Then the ballast of the commercial fixture was disconnected in favor of the circuit of FIG. 3, and the input voltage was reduced to produce the same light output. Power requirements were:

| Unmodified commercial fixture | 0.52 amps; 31 watts |
|---|---|
| With circuit of FIG. 3 | 0.23 amps; 23 watts |

The inductive coil 58 had a 42-ohm resistance and 800-milliHenry inductance that produced near resonance both with the cylclic discharge rate of the fluorescent lamp and with the series-connected current-limiting capacitor 48. This inductive coil is relatively inexpensive and starts the lamp at 92–94 volts with high reliability and should never need to be replaced.

EXAMPLE 4

The circuit of FIG. 4 constructed with the same components and tested as in Example 3 with the following results:

| Unmodified commercial fixture | 0.52 amps; 31 watts |
|---|---|
| With circuit of FIG. 4 | 0.23 amps; 23 watts |

EXAMPLE 5

The circuit of FIG. 1 was made as follows:

| Rectifiers 10,11,12,13 | 1 N 5822 |
|---|---|
| Capacitor 18 | 63 microfarads |
| Incandescent lamp 19 | 36-watt PAK spotlight |

It is believed that this spotlight has previously always been operated from a transformer. When tested in the above-described circuit, the spotlight performed as designed, drawing the same 3 amps at 12 volts as it does with the transformer. A photocell indicated the brightness was the same in both circuits. A 63-microfarad capacitor has substantially less size and weight than the transformer and should be of less cost.

Because of the relatively small size of 63-microfarad capacitor, it can be connected to an Edison screw base that can be screwed into a 120-volt socket of an ordinary top-hat fixture while leaving adequate space for the PAR spotlight within that fixture. Heretofore, when the spotlight has been used in a top-hat fixture, the transformer has been mounted externally.

I claim:

1. An inexpensive energy-efficient transformerless current-limiting circuit comprising:
    (1) a 4-rectifier bridge circuit having a pair of AC inputs and a pair of DC outputs,
    (2) a pair of single-phase or two-phase AC terminals,
    (3) means for connecting an incandescent lamp directly across the DC outputs, and
    (4) a current-limiting capacitor connected between one of the AC inputs and one of the AC terminals and providing the sole connection therebetween, the other of the AC inputs and AC terminals being directly interconnected.

2. A current-limiting circuit as defined in claim 1 wherein said AC terminals are household AC terminals.

3. A current-limiting circuit as defined in claim 1 and further comprising a second capacitor connected directly across the AC terminals.

4. An appliance including a DC motor and a transformerless current-limiting circuit comprising:

(1) a 4-rectifier bridge circuit having a pair of AC inputs and a pair of DC outputs,
(2) a pair of single-phase or two-phase AC terminals,
(3) a stator winding connected across the DC outputs, and
(4) a current-limiting capacitor connected between one of the AC inputs and one of the AC terminals and providing the sole connection therebetween, the other of the AC inputs and AC terminals being directly interconnected.

5. An appliance as defined in claim 4, the motor of which is brushless and includes a rotor-position sensor connected to the switch for controlling the timing of current flowing from the current-limiting capacitor to the winding.

6. An appliance as defined in claim 5 wherein the rotor-position sensor is a Hall sensor.

7. An appliance as defined in claim 6 including a switch connected between the stator winding and one of the DC outputs to control the current flowing from the current-limiting capacitor to the winding.

8. An appliance as defined in claim 7 wherein the switch is an SCR.

9. An appliance as defined in claim 8 and further comprising an oscillator connected to the gate lead of the SCR for applying a gate-controlling pulse to the SCR, which oscillator is stepped in amplitude, each step providing a predetermined voltage across the DC outputs.

10. An appliance as defined in claim 4 and further comprising a second capacitor directly connected across the AC input leads.

11. An appliance as defined in claim 4 and further comprising a transistor having a collector lead connected to one lead of the stator winding, the other lead of the stator winding being connected to one of the DC outputs, an emitter lead connected to the other of said DC outputs, and a base lead to which a Hall sensor is connected.

12. An appliance including a discharge lamp and a transformerless current-limiting circuit comprising:

(1) a 4-rectifier bridge circuit having a pair of AC inputs and a pair of DC outputs,
(2) a pair of single-phase or two-phase AC terminals,
(3) means for connecting the discharge lamp directly across the DC outputs, and
(4) a current-limiting capacitor and an inductive coil connected in series between one of the AC inputs and one of the AC terminals and providing the sole connection therebetween, the other of the AC inputs and AC terminals being directly interconnected.

13. An appliance as defined in claim 12 and further including a starter connected across the discharge lamp and comprising another inductive coil which is selected to be at near resonance both with the cyclic discharge rate of the lamp and with the series-connected current-limiting capacitor.

14. An appliance as defined in claim 12 wherein the discharge lamp is a fluorescent lamp.

15. An appliance as defined in claim 12 wherein the discharge lamp has a pair of cathode leads at each end, and each pair is connected directly across DC outputs of the rectifiers of the bridge circuit.

16. An appliance as defined in claim 15 and further including a starter coil connected between one cathode lead at each end of the discharge lamp.

17. An appliance including (a) a fluorescent lamp having two cathode leads at each end and (b) a transformerless current-limiting circuit comprising:

(1) a 4-rectifier bridge circuit having a pair of AC inputs and two pairs of DC outputs,
(2) a pair of single-phase or two-phase AC terminals,
(3) means for connecting two cathode leads at opposite ends of the fluorescent lamp across one pair of the DC outputs and for connecting the other two cathode leads across the other pair of DC outputs, and
(4) a current-limiting capacitor and an inductive coil connected in series between one of the AC inputs and one of the AC terminals and providing the sole connection therebetween, the other of the AC inputs and AC terminals being directly interconnected.

* * * * *